(12) United States Patent
Sever et al.

(10) Patent No.: US 8,544,062 B2
(45) Date of Patent: Sep. 24, 2013

(54) METHOD AND SYSTEM FOR IMPROVING COMPUTER NETWORK SECURITY

(75) Inventors: Gil Sever, Rosh-Haayin (IL); Zvi Gutterman, Jerusalem (IL); Shahar Talmi, Tel-Aviv (IL)

(73) Assignee: Safend Ltd., Tel Aviv (IL)

( * ) Notice: Subject to any disclaimer, the term of this patent is extended or adjusted under 35 U.S.C. 154(b) by 1481 days.

(21) Appl. No.: 10/597,003

(22) PCT Filed: Nov. 22, 2004

(86) PCT No.: PCT/IL2004/001073
§ 371 (c)(1),
(2), (4) Date: Jul. 6, 2006

(87) PCT Pub. No.: WO2005/054973
PCT Pub. Date: Jun. 16, 2005

(65) Prior Publication Data
US 2009/0037594 A1 Feb. 5, 2009

Related U.S. Application Data

(60) Provisional application No. 60/526,446, filed on Dec. 3, 2003.

(51) Int. Cl.
*H04L 29/00* (2006.01)
(52) U.S. Cl.
USPC ............................. 726/3; 713/182; 709/230
(58) Field of Classification Search
USPC ................................ 709/229, 230; 713/168
See application file for complete search history.

(56) References Cited

U.S. PATENT DOCUMENTS

| | | | | |
|---|---|---|---|---|
| 4,799,153 | A * | 1/1989 | Hann et al. | 726/3 |
| 6,088,451 | A * | 7/2000 | He et al. | 726/8 |
| 6,134,591 | A * | 10/2000 | Nickles | 709/229 |
| 6,467,040 | B1 * | 10/2002 | Apte et al. | 713/168 |
| 6,587,949 | B1 * | 7/2003 | Steinberg | 713/193 |
| 6,769,071 | B1 * | 7/2004 | Cheng et al. | 714/4 |
| 2002/0073340 | A1 * | 6/2002 | Mambakkam et al. | 713/202 |
| 2003/0131245 | A1 | 7/2003 | Linderman | |
| 2003/0152067 | A1 | 8/2003 | Richmond et al. | |
| 2003/0154380 | A1 * | 8/2003 | Richmond et al. | 713/182 |
| 2003/0177389 | A1 | 9/2003 | Albert | |

OTHER PUBLICATIONS

International Search Report for International Application No. PCT/IL04/01073 mailed Aug. 29, 2005.

* cited by examiner

*Primary Examiner* — Jeffrey Pwu
*Assistant Examiner* — Michael D Anderson
(74) *Attorney, Agent, or Firm* — Pearl Cohen Zedek Latzer Baratz, LLP

(57) ABSTRACT

Computers connected to a private network are monitored and controlled through the use of a client agent that operates in association with the computer and a server client that establishing security parameters, privileges and authorizations for the computer. The invention can prevent access to certain devices according to an active security policy. Any activity of the computer, such as a request to transfer data to an external device, access a particular file, etc. is monitored and controlled by the client agent. No operations or procedures are allowed by the computer inconsistent with the active security policy. The security policy may be set by the administrator of the private network according to the user rights and position in the organization.

37 Claims, 5 Drawing Sheets

METHOD AND SYSTEM FOR IMPROVING COMPUTER NETWORK SECURITY

CROSS-REFERENCE TO RELATED APPLICATIONS

This application is filed under 37 U.S.C. 371 based on International Patent Number PCT/IL2004/001073 which claims the benefit of the filing date of United States Provisional Application for Patent entitled "METHOD AND SYSTEM FOR IMPROVING COMPUTER NETWORK SECURITY" and which was filed on Dec. 3, 2003 and assigned Ser. No. 60/526,446, the content of which is incorporated herein by reference.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISK APPENDIX

Not applicable.

BACKGROUND OF THE INVENTION

The present invention relates to the field of private network security and, more particularly, to protecting private networks from leakage or extraction of information or insertion of unapproved material when the clients are connected to the private network or not connected (i.e., working online or offline).

Commercial corporations, enterprises, organizations, such as government, health, military, financial, etc., face several computer security concerns. One of these concerns is the leakage of information from their internal computer network to the outside world. The threat of information leakage may come from outsiders as well as from inside the organization by disloyal or careless employees.

Internal employees may use their permission to gain access to the enterprise's information, download the information to their client computer and then transfer the information to an external device. The external device may be a removable storage device (e.g. flash memory, such as but not limited to, DiscOnKey or a removable hard disk drive), a removable storage media (e.g., floppy disk or writable CD ROM), a PDA, a cellular phone, WiFi dongle, MP3 player, Bluetooth dongle, printer, digital camera, tokens, etc. DiskOnKey is a registered trademark of M-Systems. A PDA is an acronym for Personal Digital Assistant, a handheld device that may have computing, telephone/fax, Internet and networking features. Communication with such external devices may be done over a variety of data communication physical ports such as USB, FireWire, PCMCIA bus, SCSI bus, iSCSI, Cellular, Infiniband, Serial, Parallel, LAN port, Fiber Channel, Infrared, wireless communication such as but not limited WiFi, Bluetooth, etc.

Another device that may be used for transferring information out of an organization is the employee's portable computer (e.g. a laptop computer, a cellular device). Today, in many organizations, a peer may have a laptop computer instead of, or in addition to his desktop computer. An employee can easily copy valuable information onto the laptop and then carry it out. Subsequently, when the laptop is not connected to the private network, the valuable information can be copied, undetectably, to another storage device.

One common approach to deal with this type of security threat is by preventing access to valuable information or preventing the transfer of valuable information to external devices. Preventing the access to the information may be done physically or by software means. In addition, a user's ability to access an external storage device for the purpose of transferring information can also be prevented using physical or software techniques. However such common methods have a significant adverse effect, they can easily reduce the productivity of the users within an organization because the users may need to access the valuable information or external storage devices during day-to-day operations.

Therefore, there is a need in the art for new method that may offer a wider variety of options for controlling the transfer of information and the access to external devices. A technique for addressing this need in the art would preferably (a) permit a user to transfer certain files but prevent files containing more sensitive or valuable information from being transferred or (b) may allow access to some of the functions of an external device while preventing access to other features. For example, the technique may allow a user to synchronize his or her personal diary in the user's personal computer with the diary in his or her PDA yet prevent other files from being transferred to the PDA.

Furthermore, there is a need in the art for a method that may verify the environment to which a portable device is connected and restrict information access or information transfer capabilities based on the environment. For instance, once a device is interconnected to an environment, the restriction options associated with this environment can be checked to determine the actions and access privileges allowed in this location and thus, a decision regarding information access and transfer can be determined. This decision may be based, at least in part, on a security policy that is loaded into the portable device. In addition, there is a need in the art for a method that can analyze nesting of a communication protocol within another communication protocol.

SUMMARY OF THE INVENTION

Embodiments of the present invention meet the above-described needs in the art by providing a method for selectively preventing access to certain devices according to a security policy that is employed or active. In general, exemplary embodiments of the present invention can operate to analyze the data transportation to or from a physical communication port according to the relevant layers that are used in the communication protocol. Based on the employed security policy and the type of the communication that has been analyzed, a decision is made as to whether to allow the transportation of the data, block the transportation, modify the transportation, inform the user and/or the administrator about the transportation attempt, etc. The security policy may be set by the administrator of the private network according to the user rights and position in the organization.

An exemplary embodiment of the present invention may include a Security Manager Module and a plurality of client agents. The Security Manager Module (SMM) can reside on a security server in a central location in the private network and can manage or enforce the security policy. The SMM is operated by a system administrator. The client agent, which may be a software module and/or a hardware device, is installed in each one of the computers that can be connected to the private network. The existence of the client agent can be a mandatory condition for enabling the connection to the private network. In such an embodiment, the private network may not respond to a computer that does not have a client agent.

The client agent operates to sniff the data transportation to or from one or more of the physical communication ports or buses, analyzes the data transportation according to the communication protocol and in response to the analysis, determines how to proceed with the data transfer. The policy that is associated with a certain client agent may configure the client agent to block the transportation of certain types of files, such as, but not limited to, software code, source code, drawings, etc. In addition or alternatively, the policy may allow certain applications to be executed while blocking the execution of other applications. Moreover, the client agent may be configured to send an indication to the SMM and can be configured to send messages to the user as well. The policy that is associated with each one of the client agents may be updated from time to time by the administrator via the SMM.

For a communication that operates according to the Seven Layer Model, exemplary embodiments of the present invention may analyze one or more layers from the existing layers in order to reach a decision regarding the handling of the communication. Moreover in cases in which the communication is using a nesting of one protocol under another protocol, exemplary embodiments of the present invention may analyze the one or more protocols and may reach a decision on the nested protocol. For example, if a WiFi Dongle is connected to a USB port, both protocols may be analyzed. A decision whether to allow the communication or not may depend, for example, on the SSID (Service Set Identifier— secret token to identify a Wi-Fi) property of the WiFi connection. The SSID property defines the name of the wireless network.

Moreover exemplary embodiments of the present invention may verify whether an external device that has been connected to a physical communication port behaves as it is expected to behave or if the device is emulating or impersonating another device. For example, a portable memory that is connected over a USB port may be built to emulate a digital camera upon establishing a connection. Later on, the user may attempt to load files into the portable memory. Exemplary embodiments of the present invention can operate to detect such an activity and then block the communication. Thus, the portable memory can be used as a digital camera for loading information into a computer but any attempt to transfer files to the portable memory will be thwarted.

Other objects, features, and advantages of the present invention will become apparent upon reading the following detailed description of the embodiments with the accompanying drawings and appended claims.

DETAILED DESCRIPTION OF EXEMPLARY EMBODIMENTS

Turning now to the figures in which like numerals represent like elements throughout the several views, exemplary embodiments of the present invention are described. For convenience, only some elements of the same group may be labeled with numerals. The purpose of the drawings is to describe exemplary embodiments of the present invention and not for production or limitation. Therefore, features shown in the figures are chosen for convenience and clarity of presentation only.

Figure 1:
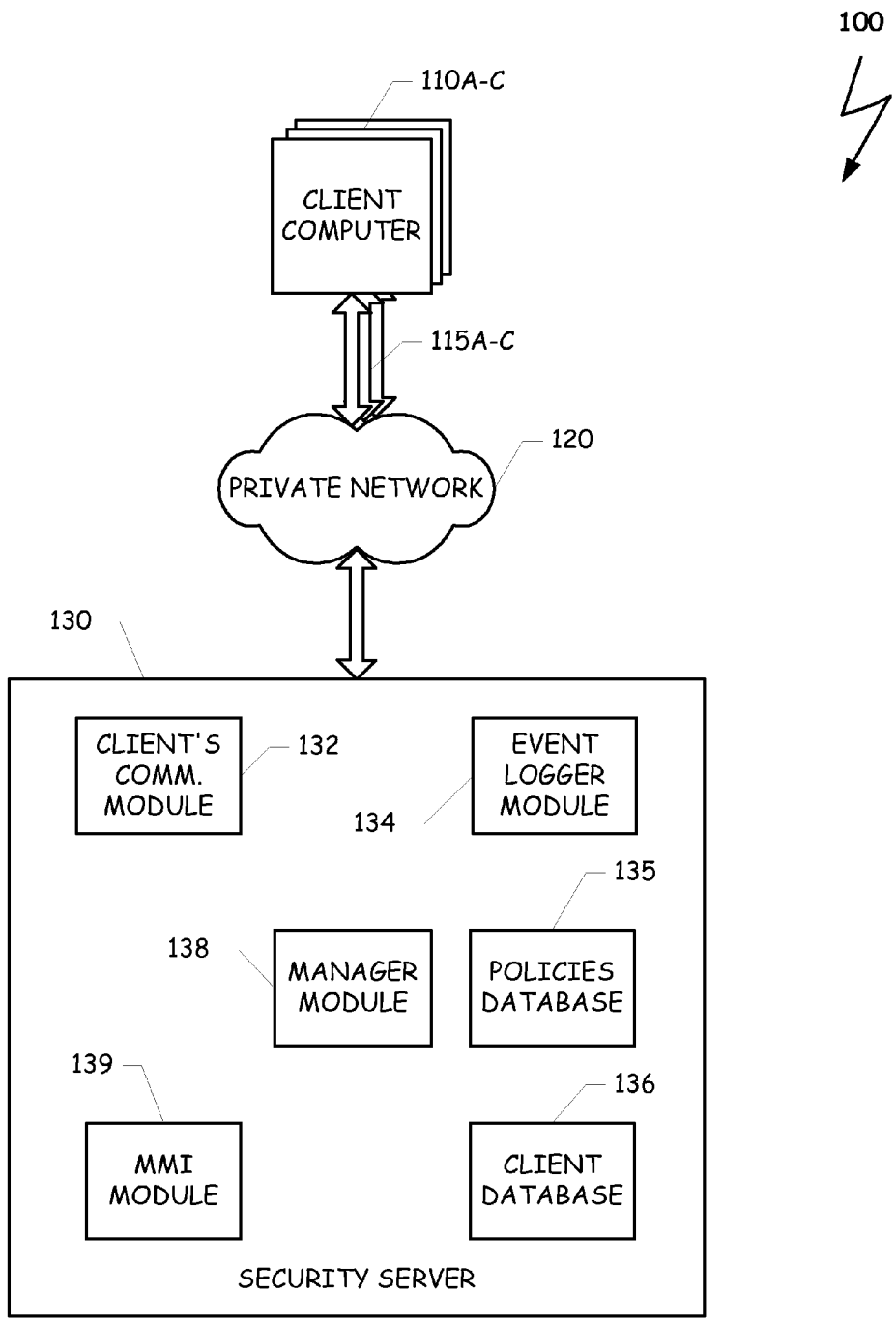
FIG. 1 illustrates a block diagram with relevant elements of a computer system that uses an exemplary embodiment of the present invention.

FIG. 1 is a block diagram with relevant elements of a computer system 100 that uses an exemplary embodiment of the present invention for protecting the computer system from their own clients. The computer system 100 may comprise a plurality of client computers 110a-c, a private network 120, a plurality of communication channels 115a-c between the private network 120 and the plurality of client computers 110a-c, and security server 130. Three instances of client computers 110a-c and communication channels 115a-c are shown in FIG. 1 by way of example only, and it will be appreciated that any number other than three may also be used with the present invention. The private network 120 may be an Intranet, cellular network, a LAN, a VPN (Virtual Private Network) or any other type of communication network.

Each of the client computers 110a-c may be a personal computer, a workstation, a desktop computer, mainframe computer, blade server (e.g. CITRIX), dumb terminal, etc. or any other type of computing device that can be connected over private network 120. Each of the client computers 110a-c may also be a portable device, such as but not limited to a laptop computer, notebook computer, a smart phone, a personal digital assistant (PDA), or any other type of mobile device. The client computer 110a-c may be connected to various networks from time to time at home, at work, and at other locations. Communication channels 115a-c may be permanent connections, temporary connections, and wire or wireless connections. A wireless connection can be an RF connection based on a protocol such as, but not limited to, Bluetooth or WiFi. The wireless connection may also be an Infra Red (IR) connection. More information about the client computers 110a-c is disclosed below in conjunction with FIGS. 2 and 3.

The security server 130 may be an element of network 120. The security server 130 may be responsible for managing the security policies that are used over the private network 120. A plurality of policies may be used by each client computer 110a-c. The security policies may be based on the client's degree of security, the environment that the client is working in, the type of the devices that are connected to the client computer, etc. The security policies can be updated from time to time and then be loaded or reloaded into the clients.

The security server 130 can operate to ensure that all client computers comply with specified security policies. For example, if a trigger event occurs and a copy of a corporate security policy is not available on a client computer 110a-c, the client computer 110a-c may initiate a connection to the security server 130. In response to such initiation, the appropriate policies may be downloaded to the client computer 110a-c. The security server 130 may periodically update the security policies that are installed in each one of the client computers 110a-c. A security agent may be installed within the client computer 110a-c and, among other things, operates to enforce the security policy by monitoring events in accordance with the security policy.

The security server 130 can be constructed in a variety of manners and in one embodiment may comprise the following relevant modules: client's communication module 132, event logger module 134, policies database 135, client database 136, Man Machine Interface (MMI) module 139 and a manager module 138. Client communication module 132 is typically used to communicate with the plurality of client computers 110a-c over private network 120 while the client computers 110a-c are connected to the private network 120. The communication between the client computers 110a-c and the security server 130 can be encrypted to create a secure connection between the client computers 110a-c and the security server 130, over which data can be sent securely.

The communication from the security server 130 to the client computer 110 may include: the provision of updated security policies and/or periodically checking whether the installed security agent and the installed security policies have been contaminated or have been tampered with by any hostile code. If a particular client computer does not have a required client security agent or security policy installed, or the security agent was infected, the security server 130 can prevent further access to the corporate network until such client computer has installed and activated the required security agent or security policy.

The communication from the client computer 110 to the security server 130 may include: a real-time indication that is used to inform the security server 130 when the client computer 110 is connected to the private network 120, reports on events according to the security policy, reports on trials to affect the security agent or the stored security policy, etc. The report may include information on any connection of the client computer 110 to an external device, information on the data transfer, the timing of the event, the location, the device to which the data transfer was done, shadowing of the information that was transferred while the client computer 110a-c was not connected or connected to network 120, etc.

The event logger 134 may be a storage device that can be used to store the reports that have been sent from the users within a certain period and/or any policy violation event. The reports may be retrieved and processed manually by an administrator of the private network 120 or automatically by the manager module 138, which may run several statistical algorithms in order to monitor the security of the network. The process may uncover a careless user that may have connected or attempted to connect certain devices to the client computer 110, may identify attempted access to certain communication ports/buses, and may uncover certain actions with the combination of the location and/or device that infringes the security policy. The report may also identify a negative trend, for example, that in more than one client computer the security agent has been tampered, etc. When a portable client is not connected to the network 120, the events may be kept by the client agent and be sent to the security server 130 when the client is reconnected to the private network 120.

Policy database 135 is a database that includes a plurality of policies, including security policies that may be used by the organization that owns the private networks 120. A security policy may include a set of rules that are used to determine whether a given client computer can be permitted to gain access to a specific device. The security policy may depend on various factors. Such factors can include the location of the client, the external devices, the type of applications, etc. For instance, a certain client computer may have different security policies that are activated based on the location at which the client computer is being operated. In addition, different security policies may be allocated to different users; group of users; working hours, etc.

Client database 136 is a database that may include information regarding the various client computers 110a-c that may be connected over private network 120. This information may include items such as but not limited to: client level of security, the type of equipment that the client possess, the external devices to which the client computer is allowed to be connected, information about the different environments in which the client computer may work, etc.

Manager module (MM) 138 manages the operation of the security server 130. It may initiate tasks to check the situation of the security agent and the security policies, which are installed in the client computers. MM 138 may create and send the appropriate policies to each one of the client computers. Based on the information that is stored in the policy database 135 and the client database 136, MM 138 may create one or more policies for a particular client. For example, a client that has a portable computer may need three policies. One policy may be used while the particular client computer is connected to the private network 120. Another policy may be used when the client computer is operating in a known environment, such as but not limited to his home. The last policy may be used when the client computer is operating in an unknown environment or location. The MM 138 may run Artificial Intelligence algorithms over the information that is stored in the event logger 134 and may send indications and conclusions to the administrator of the network. The MM 138 may receive decisions regarding certain activities of a client computer and affect his connection to the private network 120 based on such decisions.

The MMI module 139 may be a graphical user interface (GUI) that may be used by the administrator of the system to communicate with the security server 130. The MMI may allow simple access to change policies, retrieve and check reports, update the client database 136, etc.

Figure 2:
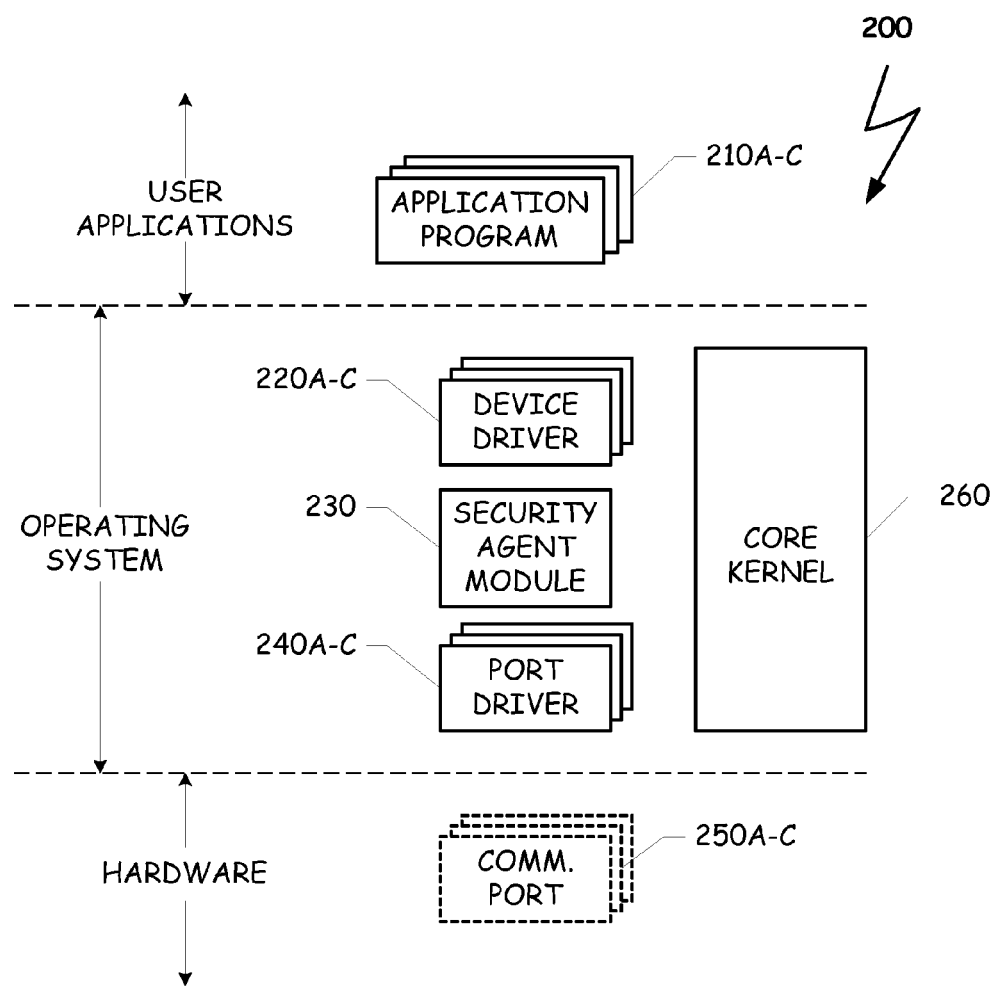
FIG. 2 is a block diagram with relevant elements of a software system that is used in a client computer according to an exemplary embodiment of the present invention.

FIG. 2 is a block diagram with the relevant elements of a client system 200 that may be used in an exemplary client computer 110a-c (FIG. 1). The client system 200 may comprise one or more application programs 210a-c, one or more device drivers 220a-c, a security agent module 230, one or more physical communication port or bus drivers (stack) 240a-c, a core kernel module 260 and one or more physical communication ports or buses 250a-c. Generally, the data transportation between a client computer and a device flows from/to an application 210a-c to/from a physical communication port 250a-c via the appropriate device driver 220a-c, security agent 230 and the appropriate port driver 240a-c. The example illustrated in FIG. 2 shows the use of three application programs 210a-c, device drivers 220a-c, port drivers 240a-c and physical communication ports 250a-c; however, it will be appreciated that any number other than three may be used with the present invention. The client system 200, or aspects of the client system 200, may be stored in a fixed storage medium (e.g. a disc, flash memory, a read-only memory (ROM) etc.). During the operation of the client computer, one or more of the software modules may be retrieved from the fixed storage medium and may be loaded into a temporary memory such as a random-access memory (RAM).

The core kernel 260, the device drivers 220a-c and the port/buses drivers 240a-c may jointly be referred to as the operating system (OS) of the client computer 110a-c (FIG. 1). The OS may manage low-level aspects of computer operation, including managing execution of processes, memory allocation, file input and output (I/O) and device I/O. Exemplary OS utilized may be windows NT or XP, Unix, MAC OS, MVS; LINUX, SYMBIAN, PALOS, etc. One or more application programs 210*a-c* may be transferred from a fixed storage medium into the RAM for execution by the client system 200. The application program 210*a-c* may be a program such as, but not limited to, (a) synchronization applications for a PDA, (b) Java applications for synchronization with external Java devices, such as but not limited to cellular telephones, backup storage applications and (c) communication applications such as but not limited to application that utilize Bluetooth or WiFi protocols, Internet browser, etc.

When the core kernel 260 and/or one or more application programs 210*a-c* may want to communicate with an external device the appropriate device drive 220*a-c* may be invoked. The device driver 220*a-c* is used as an intermediary between the core kernel 260 and/or one or more application programs 210*a-c* and the external device itself. Exemplary external devices can include: a removable storage device, a printer, a PDA, a WiFi dongle, etc. Usually a device driver 220*a-c* is supplied by the vendor of the device itself. In addition to the device driver 220*a-c* a port driver 240*a-c* may also be invoked. The port driver/bus driver 240*a-c* is used to organize the communication according to the protocol that is used over the physical communication port 250*a-c*. For example, if communication port 250 is a USB port than a USB driver (USB stack) is needed. The above-described computer software is for illustrating the basic desktop and server computer components that may be employed by a client computer 110*a-c* (FIG. 1). In addition to those elements a security agent 230 is added by an exemplary embodiment of the present invention.

The security agent 230 may be installed in the standard storage of the client system 200 and it may be invoked during the power on cycle of the client computer 110*a-c* and remain active for the entire operation of the system. In other embodiments of the present invention, the security agent 230 may be burned onto a physical memory, such as the ROM, PROM, BIOS, etc. The security agent 230 may be installed as a section of the OS and can be handled by an administrator having the appropriate permissions. The security agent 230 may be installed in between the core kernel 260 and the one or more communication port/bus drivers 240*a-c*.

The security agent 230 may emulate a kernel device driver and will receive the communication between the device driver 220*a-c* and the core kernel 260. During the installation and/or periodically, from time to time, the security agent 230 may register in the appropriate location in the core kernel as the first device driver for receiving the communication from/to the different physical communication port/bus drivers. For example, if the OS is a Microsoft product, than the security agent 230 may register in the Registry as the first device driver to get the communication. The registration may be done in a class level or in a device level. Exemplary classes may be USB, CD-ROM drivers, Disk Controller, etc. In some operating systems, the device driver may be constructed from a stack of two or more sub-device-drivers. In such architecture, the security agent 230 may collect information from at least one of the two or more sub-device-drivers. For example, in the scenario of using a USB flash storage device, such as but not limited to, DiskOnKey (DiskOnKey is a trademark of M Systems) in the Windows (Windows is a trademark of Microsoft) environment, the stack of the relevant sub-device-drivers can include: VolSnap.sys; Disk.sys; UsbStor.sys; and Usbhub.sys. and the security agent may collect information from any of the four sub-device-drivers.

In an embodiment of the present invention the security agent 230 may emulate a filter procedure but, instead of providing the functionality of a common storage filter driver, the security agent performs security checking. A filter may perform device-specific functionality that is not provided by a class device driver. The security agent 230 may emulate more than one type of filter driver. The number of types of filters that may be emulated by the security agent 230 can be configured according to the number of physical communication ports and devices that their transportation may be checked by the security agent 230.

Security agent 230 may be activated when a physical communication port is requested. The security agent 230 may pull the transportation to and from the physical communication port, processes the information and may reach a decision regarding the legality of the requested connection and/or data transfer. Security agent 230 may act as a proxy for both sides. The security agent 230 may be transparent to the user; it may not have any icon or indication to indicate it's existence to the user. More information about the operation of security agent 230 is disclosed below in conjunction with the description of FIGS. 3, 4 & 5.

Another exemplary embodiment of the present invention (not shown in the drawings) may be used by a private user, who is not connected to a private network. The user may wish to protect the information that is stored in his computer from being copied by others. In such an embodiment, the client system may comprise some additional modules, such as the modules disclosed above in conjunction with the description of the security server 130 (FIG. 1). The additional modules may be a limited policies database 135 (FIG. 1), an event logger 134, a manager 138 and an MMI module 139.

Figure 3:
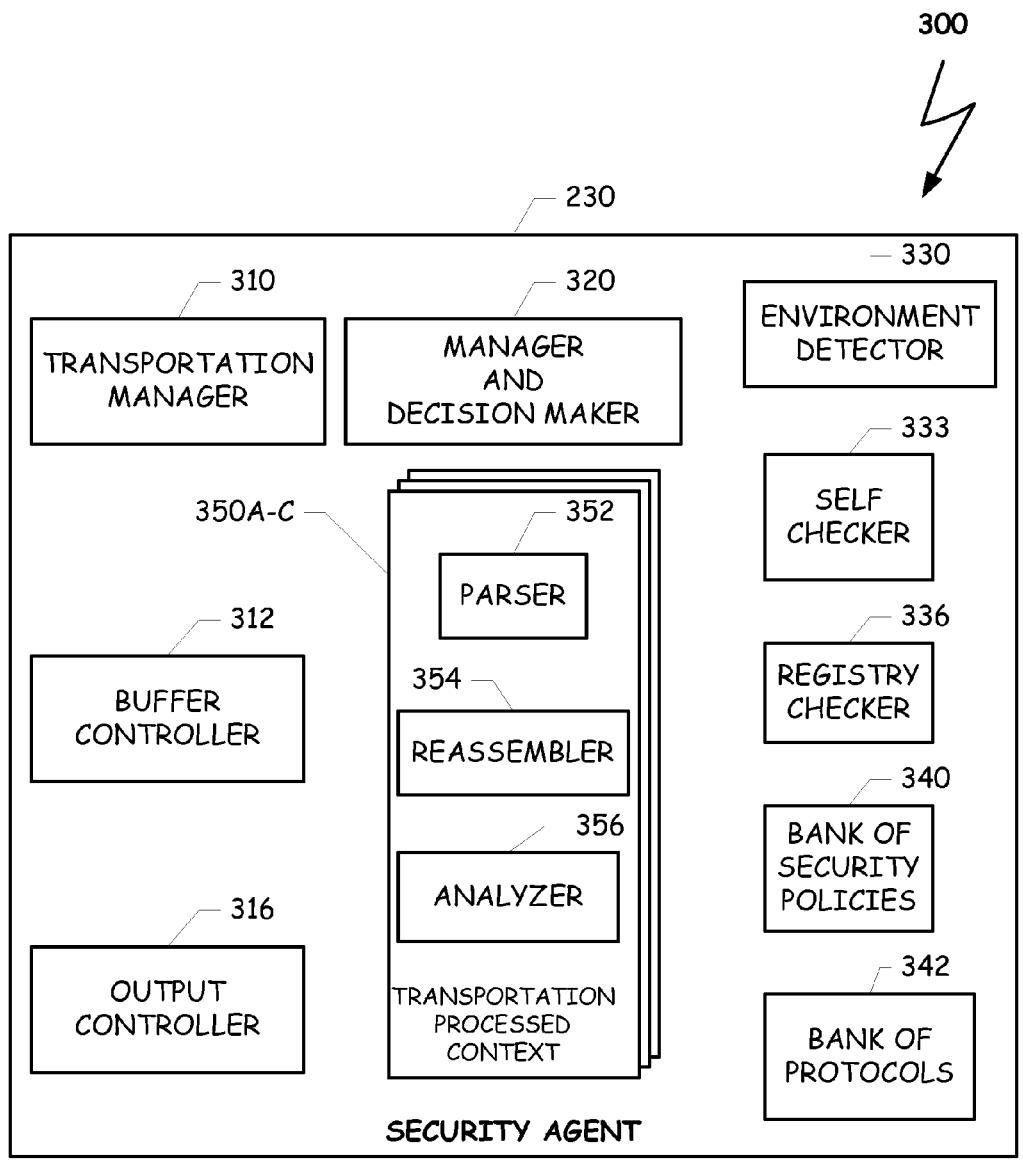
FIG. 3 is a block diagram illustrating components of the client security agent according to an exemplary embodiment of the present invention.

FIG. 3 is a block diagram with the relevant elements of a software program 300 that may be used by an exemplary security agent 230 (FIG. 2). The software program 300 may comprise a transportation manager (TM) 310, a buffer controller (BC) 312, an output controller (OC) 316, an environment detector (ED) 330, a self checker 333, a History checker 336, a bank of security policies (BOSP) 340, a bank of protocols (BOP) 342, a manager and decision maker (MDM) 320, and one or more transportation processed context (TPC) 350*a-c*. Three examples of transportation processed contexts (TPC) 350*a-c* are shown in FIG. 3 by way of example, and any number other than three may be used with the present invention. Each one of TPC 350*a-c* may comprise a parser 352, a re-assembler 354 and an analyzer 356.

The data transportation to/from a physical communication port 250*a-c* (FIG. 2) may be transferred via TM 310, BC 312 and OC 316. TM 310 may be a software module that manages the transportation via the security agent 230. The TM 310 may manage a table with the relevant parameters that may be needed to maintain the communication sessions that are currently transferred via the security agent. Exemplary parameters may be the source and the destination address of the data flow. In another example a packet counter that counts each time a data portion is transferred to or from a communication port 250*a-c* (FIG. 2) is used in order to limit the amount of data portions (the size of the file) that are routed to the TM 310. The data portion may be a packet for a USB communication port or a SCSI block for a SCSI bus. It should be noted that the terms "packet", "data portion", "data-gram" and "SCSI block" are used interchangeably herein. Henceforth, the description of the present invention may use the term 'packet' as a representative term for any of the above group. From the TM 310, the packet may be transferred, as is, to BC 312, which stores the packet in an appropriate location in a buffer according to the source and the destination of the communication. Following this, an indication may be sent to the MDM 320 informing the MDM 320 regarding the new packet. The TM 310 may manage transportation through one or more physical communication ports simultaneously. More information on the operation of TM 310 is disclosed below in conjunction with the discussion of FIG. 4.

The BC 312, which can be implemented in a software module, controls a buffer (not shown in the drawings) in which the data transportation, which is currently handled by the security agent 230 (FIG. 2), may be stored. The buffer may be organized in sections; each section may be dedicated to a certain data transfer session. The data from the buffer may be retrieved and processed by an appropriate TPC 350a-c. The MDM 320, based on the result of the process that was done by the appropriate one or more TPC 350a-c, may instruct the BC 312 whether to transfer the data to the output controller 316 to be sent to one or more appropriate destinations or to delete the data that belongs to this session. More information on the operation of the BC 312 is disclosed below in conjunction with the discussion of FIGS. 4 & 5.

The OC 316 may maintain the connection of the one or more data transfer sessions that are currently transferred via the security agent 230 (FIG. 2). Based on instructions that may be received from the MDM 320, the OC 316 may block the transportation to/from the appropriate communication port 250a-c; or may send the packets to its original destination in a way that the operation of security agent 230 is transparent; or in parallel to being sent to its destination the packets may be sent to a shadowing device (not shown in the drawing) for storage. In order to maintain the flow of operation of the client computer 110a-c, when needed, the OC 316 may block the transportation of the data while maintaining the connection. An indication may be sent to the user, informing the user that there is a problem in the data communication and the application may continue operation and then terminate in a normal manner. More information on the operation of the OC 316 is disclosed below in conjunction with the discussion of FIG. 5.

The ED 330 may detect the environment to which the client computer 110a-c (FIG. 1) is currently connected. A client may have a portable device, such as but not limited to, a laptop, which may be carried out of the organization's premises and may be operated in an environment other than the private network 120 (FIG. 1). Thus, the user may operate the portable device within the user's home where the computer may be connected to his or her Internet service provider, printer, CDROM writer etc. Another exemplary location may be a public place such as a coffee shop, hotel, airport, in which the client may be connected to the Internet via a wireless connection using a WiFi dongle or a Bluetooth dongle. In each environment, it may be necessary to apply a different security policy.

Identification of the environment may be based on several criteria. For example, the ED 330 may have one or more environment profiles. From time to time, the profiles may be loaded by the security server 130. Each user may have its own environment profiles according to the environment in which the user has a tendency to work. Each environment profile may include several parameters that describe or affect various aspects of the environment in which the client computer currently operates. For example, an environment profile may have a list of external devices to which the client may be connected when operating in a particular environment. These external devices may include, but are not limited to, printers, external storage devices, etc. An environment profile may also have information on network elements that may be connected to the client computer in the particular environment. For example, gateway addresses, modems, RF network names, router addresses, etc. In addition, the environment profile may include a network configuration, such as but not limited to, encryption existence and type, default packet size, etc.

The information about the environment obtained by the environment detector 330 is transferred to the MDM 320. The information may indicate the location of the client computer 110 or may indicate that the current location is unknown. Based on the current location, a security policy may be selected from the BOSP 340.

The BOSP 340 manages one or more security policies that are installed from time to time by the administrator of the private network 120 (FIG. 1), while the client computer 110 is connected over the private network 120. The BOSP 340 may include policies that are relevant to certain locations, in which the client computer may be used. Moreover, the policy may be dependent upon the time of operation, the type of network, capabilities and types of external devices, the number of external devices, etc. In an exemplary embodiment, the different policies can be organized within the BOSP 340 using a hierarchic architecture. The top of the hierarchy may be the location, (e.g. at work, home, at a subsidiary, unknown place, etc). The second level of the hierarchy may be the network type and configuration (e.g. wired LAN, wireless LAN such as WiFi or Bluetooth or IR, public Internet, Intranet, encryption, etc). The third level may be the type of the external device (e.g. a removable storage device, removable storage media, a PDA, a cellular phone, WiFi dongle, Bluetooth dongle, a digital camera, etc.). Other exemplary methods may have additional levels or may organize the BOSP 340 using other architectures.

Each security policy may comprise a plurality of rules that may control a connection, or attributes of a connection, between a device and the client computer, and control the communication session between the device and the client computer. The rules may define: the maximum volume of data that can be transferred during a certain session; the maximum time for the session; the type of applications (e.g. read, write, synchronization etc.) that may be used; the type of files (e.g. word documents, email, markup language files, executable files, etc.) that may be transferred; the verification method that may be used during the session to verify that the device acts as expected.

From time to time, the content of the BOSP 340 may be checked and updated manually by the administrator of network 120 or automatically by the security server 130 (FIG. 1). From time to time, the MDM 320 may check that the BOSP 340 has not been tampered with by hostile code. If the BOSP 340 has been damaged or otherwise altered, the MDM 320 may prevent any data transportation to/from any external device. More information on the operation of the BOSP 340 is disclosed below in conjunction with the discussion of FIG. 5.

The BOP 342 may comprise information that may be used for parsing the packets and reassembling the content of the data that is transferred during a certain session. In addition the BOP 342 may include rules for analyzing the content of the reassembled data. The information in the BOP 342 may be organized in a hierarchical architecture. The first level of the hierarchy may be associated with the type of the data communication port or bus 250a-c (FIG. 2), (e.g. USB, FireWire, PCMCIA, SCSI, Infrared, wireless communication such as but not limited WiFi, Bluetooth, iSCSI, Cellular, Infiniband, Serial, Parallel, LAN port, Fiber Channel, etc). The second level of the hierarchy may be associated with the type of the external device (e.g. a removable storage device, removable storage media, a PDA, a cellular phone, WiFi dongle, Bluetooth dongle, a digital camera, etc.). The third level of the BOP 342 may be associated with the application that is currently used in the communication session. For example, synchronization, data storage or backup and communication applications. Other exemplary embodiments of the BOP 342 may include other levels or may be organized using other types of architectures.

For example, in case that a mass storage device, such as but not limited to DiskOnKey, is connected over a USB port, the first level of the BOP 342 may refer to a USB communication port. The USB entry may include information regarding parsing and reassembling the data that is associated with the physical layer of the communication over a USB port. The result of processing the packet according to the information that is stored in the first level of the BOP 342 may be the type of the device that is currently connected over the USB port (e.g. Digital camera, a DiskOnKey, WiFi dongle, Bluetooth dongle, etc.); the vendor ID; product ID, device class, device type, device description string, etc.

The information in the second level of the BOP 342 may refer to the type of the external device that is connected over the USB port. For example, in the scenario in which the external device is a DiskOnKey, the information in the second level of the BOP 342 may include information that is required to parse and reassemble the application layers of the communication. The third level includes information regarding the applications themselves, for instances the applications or operations may include, but not limited to, operations such as reading, writing, opening, closing, etc.

In another example, when a WiFi dongle is connected over a USB port, more protocol levels may be necessary than in the case of DiskOnKey. The WiFi dongle may allow communication over the Internet and thus, six protocol levels may be required and stored in the BOP 342 in order to parse, reassemble and analyze the communication that can be transferred via a WiFi dongle. The first level of the BOP 342 may refer to a USB communication port. The second level of the BOP 342 may refer to a WiFi protocol such as. but not limited to, IEEE 802.11B, the third level may refer to the Ethernet protocol, the level may refer to the Internet Protocol, the fifth level may refer to TCP or UDP or similar protocol and the sixth level may refer to the application itself, such as Microsoft Outlook, for example. More information on the operation of the BOP 342 is disclosed below in conjunction with the description of FIG. 5.

The TPC 350*a-c* is a temporary context that may be created by the MDM 320 according to the current needs of the communication session. The first TPC 350 may be initiated after receiving a notice from the transportation manager 310 that a communication session is requested via a communication port/bus 250*a-c*. During initialization, the first context is established with parser 352, reassembler 354 and analyzer 356 modules being loaded with the appropriate information. The information is loaded from the first level of the BOP 342 according to the type of the communication port/bus that is requested.

Additional contexts 350 may be issued during the flow of the communication by the MDM 320. Usually a context 350*a-c* is associated with parsing, reassembling and analyzing a layer in the communication. Therefore when a TPC 350 collects enough information to define the next layer in the communication, it may inform the MDM 320 about the next layer. The information is collected from the buffer in which the packets are stored. In response, the MDM 320 may create the next TPC 350. The MDM 320 may instruct the BOP 342 to transfer the next level of information to the new TPC 350. The next level of information may include information on parsing, reassembling and analyzing the next communication layer that may be the device layer. At the end of the communication session, the one or more TPCx 350*a-c* may be released.

In some exemplary embodiments of the present invention TPC 350*a-c* may modify the content of the data. The modification may influence the type of the transportation. For example, a response to a question about the capabilities of a certain device driver may be modified to conceal the options of read and/or write. In other cases packets may be modified in order to be compatible with the protocol that is used. The modification may correct misuse or may avoid attack. More information on the operation of TPC 350*a-c* is disclosed below in conjunction with the discussion of FIG. 5.

The MDM 320 manages the operation of the security agent 230. It may communicate with the security server 130 in order to download updated policies, run security tests, send reports to administrator, etc. From time to time, the MDM 320 may receive, from the ED 330, information on the environment in which the client computer currently operates. When a communication session is initiated, the MDM 320 may receive an indication regarding the communication port 250 (FIG. 2) that is associated with the session. Based on the communication port, the time of the session and the information regarding the current environment, the MDM 320 may select a security policy from the BOSP 340. Subsequently, the MDM 320 can create a TPC 350 and instruct the BOP 342 to transfer the appropriate information that is relevant to the communication port to the new TPC 350. When results are received from one of analyzers 356 running within a TPC 350, the MDM 320 may analyze the results to reach a decision. The decision can be based, at least in part, on the selected security policy. The decision may be an instruction to the output controller 316 to indicate whether to transfer the packets from the buffers or to block the communication. A decision may include establishing an additional TPC 350 in order to process the next layer. A report may be issued by MDM 320. From time to time the MDM 320 may request the ED 330 to initiate a learning cycle of the current environment, or the MDM 320 may initiate a task for checking the possibility that one or more of the modules of the security agent 230 may have been tampered with or altered.

A self-checker 333 may be invoked from time to time by the MDM 320 in order to verify that the security agent 230 has not been tampered with, altered or otherwise disrupted. The time intervals between activity cycles of the self-checker 333 may be in the range of few minutes to a few hours. Self-checker 333 may verify that the security agent 130 is still registered and the validity of the BOSP 340. If a problem is identified, the MDM 320 may try to correct it, for example by registering again. If the problem cannot be corrected, the transportation via the relevant ports/buses may be blocked.

The History checker 336, may be added, as an optional module, to the security agent 230. From time to time, while the client computer 110 is connected over private network 120 (FIG. 1), the History checker 336 may be invoked by security server 130 (FIG. 1). The History checker 336 may check the operating system in order to verify the type of device drivers and the communication port drivers that have been active. The information about the history can be logged by the History checker 336. This module may be used as a forensic tool that may deliver information to the security server 130 about the external devices that were connected to the computer client and the communication port that was used.

Another exemplary embodiment of the present invention may utilize more than one security agent module 230. Each security agent module 230 may be associated with a communication port. Other exemplary embodiments may use one or more permanent TPC 350 modules instead of creating a required context when it is needed. Each module may be associated with a certain protocol and/or device and/or application.

Figure 4:
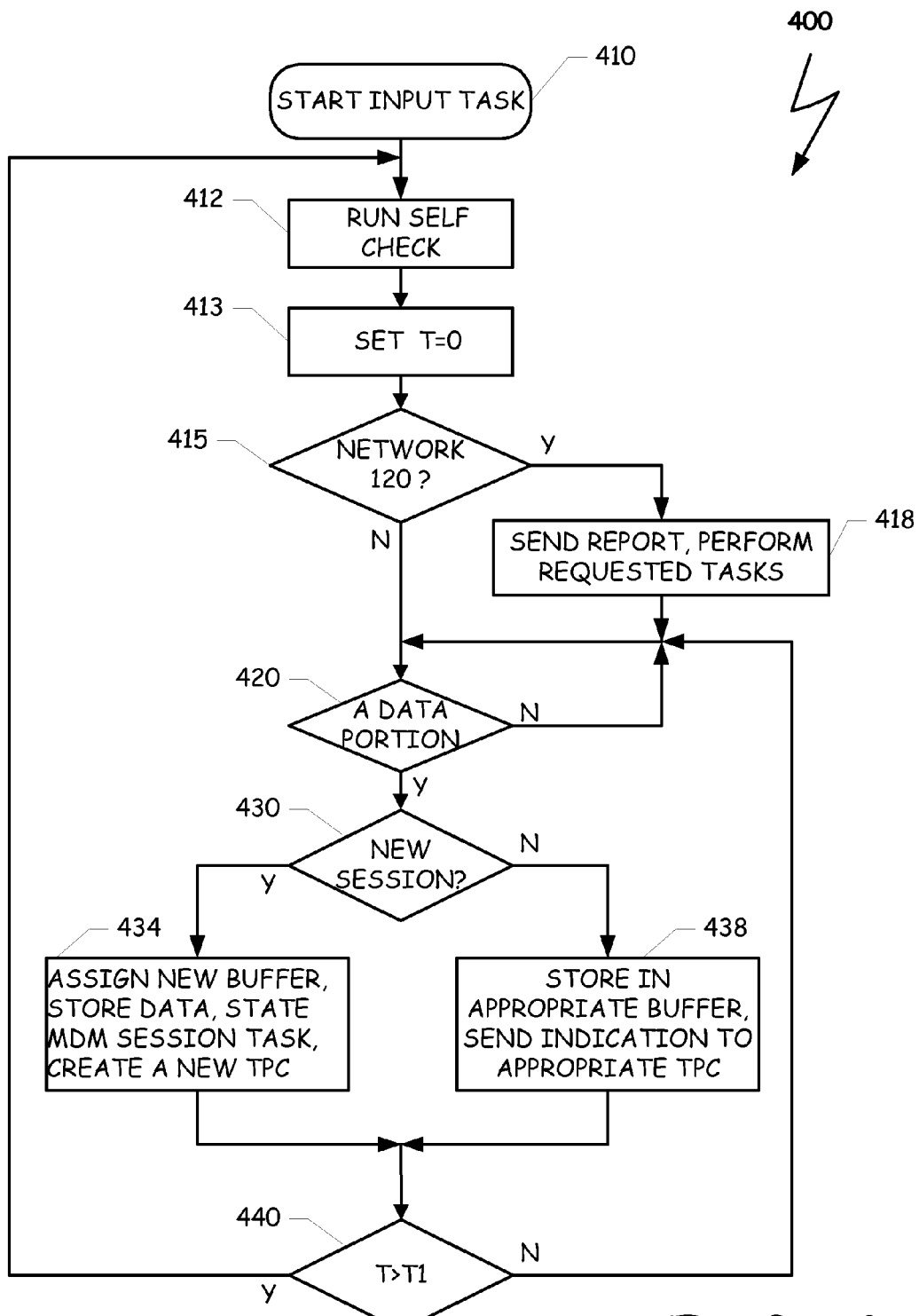
FIG. 4 illustrates a flowchart with relevant steps of an exemplary method for managing input portion of data transportation via the security agent.

FIG. 4 illustrates a flowchart depicting relevant steps of an exemplary method 400. The method 400 may be used by the MDM 320 (FIG. 3) for managing the input portion of data transportation via the security agent 230 (FIG. 2). The method 400 may be initiated 410 when the client computer 110*a-c* (FIG. 1) is turned on and may run as long as the computer 110*a-c* remains on. Upon initializing, the self-checker module 333 (FIG. 3) may be invoked 412. The self-checker 333 may operate to check whether the security agent 230 has been tampered with or modified. For example, by checking that the registration information in the Registry is appropriate. The results of the self checking are sent to the MDM 320, which may use them in processing a decision of how to respond in certain data transfer sessions. At the end of the self-checker task 412 a timer is set to an initial value (0) 413. The timer is used to define the period between repeating the self-checking process.

At step 415 in the illustrated flow diagram, a decision is made as to whether the client computer 110*a-c* is connected over the private network 120 (FIG. 1). If the client computer 110*a-c* is connected over the private network 120, the security agent 230 initiates a communication session 418 with the security server 130 via the private network 120. The security agent 230 may send the result of the self-check to the security server 130 and deliver reports on the data transfer activity that has been done in the period between the last update and now. The report may include information on the files that were transferred, information on the devices that were used, the timing and the location of each data transfer session, shadowing information, etc.

During the communication session, the security server 130 may request the security agent 230 to perform additional tasks. For example, the security agent 230 may be requested to invoke the History checker module 336 in order to collect information on the different devices that have been registered between the last update and now. In addition, the security server 130 may update the BOSP 340 (FIG. 3) in the security agent 300. At the end of the communication session with the security server 130, the method 400 may proceed to step 420.

If it is determined at step 415 that the client computer 110*a-c* is not connected to private network 120, then the method 400 may proceed to step 420 and wait for a data portion. The data portion may be a variety of packet types including, but not limited to, a packet for a USB communication port or a SCSI block for a SCSI bus, etc. When a data portion is received, a decision is made as to whether the data portion belongs to a new session 430. This decision may be based, at least in part, on a connection table and the relevant source or destination addresses of the data portion, or the time slot that is associated with the data portion. The connection table may include information on the connections that are currently managed by the TM 310 (FIG. 3). The information may include, but is not limited to, source and destination addresses, pointers in the buffer to the stored data that belongs to the session, port information, device information and application information, etc. The information from the connection table may also be used by other modules. Modules such as, but not limited to, the MDM 320, one or more TPC 350*a-c* and OC 316.

If it is determined that the session is a new session, then a new entry in the connection table is added, a new buffer is assigned to this session and the data portion is temporary stored in this buffer 434. In parallel with these actions, a new session task is initiated in the MDM 320 in order to manage the handling of the new session. The session task may request information from the environment detector 330 and based on the current environment and the communication port, a security policy may be retrieved from BOSP 340 (FIG. 3).

In addition to these actions, a new TPC 350 (FIG. 3) is created to process the data and the appropriate protocol that matches the communication port is retrieved from BOP 342 (FIG. 3). Later, the internal modules of TPC 350 (Parser 352, Re-assembler 354 and Analyzer 356) are constructed with the appropriate software code to meet the specifications of the retrieved protocol. The new TPC receives the pointer to the stored data and starts processing the information. In parallel to the operation of the TPC, the method 400 may proceed and continue to step 440.

In step 440, the value of timer 'T' is compared to period 'T1'. If timer 'T' is smaller than 'T1', then method 400 may return to step 420 and wait for the next data portion. If 'T' is equal to or greater than 'T1', than method 400 may return to step 412 and may invoke the self-checker module 333 again. Typical values of period 'T1" may be in the range of few minutes to few hours.

If it is determined that the session 430 is not a new session, then the received data portion is stored in the appropriate buffer and a pointer is stored in the connection table 438. The pointer is sent to the appropriate TPC 350 (FIG. 3), which reviews the transportation of this session. The TPC 350 may retrieve the stored data portion when it is needed to be processed.

Figure 5:
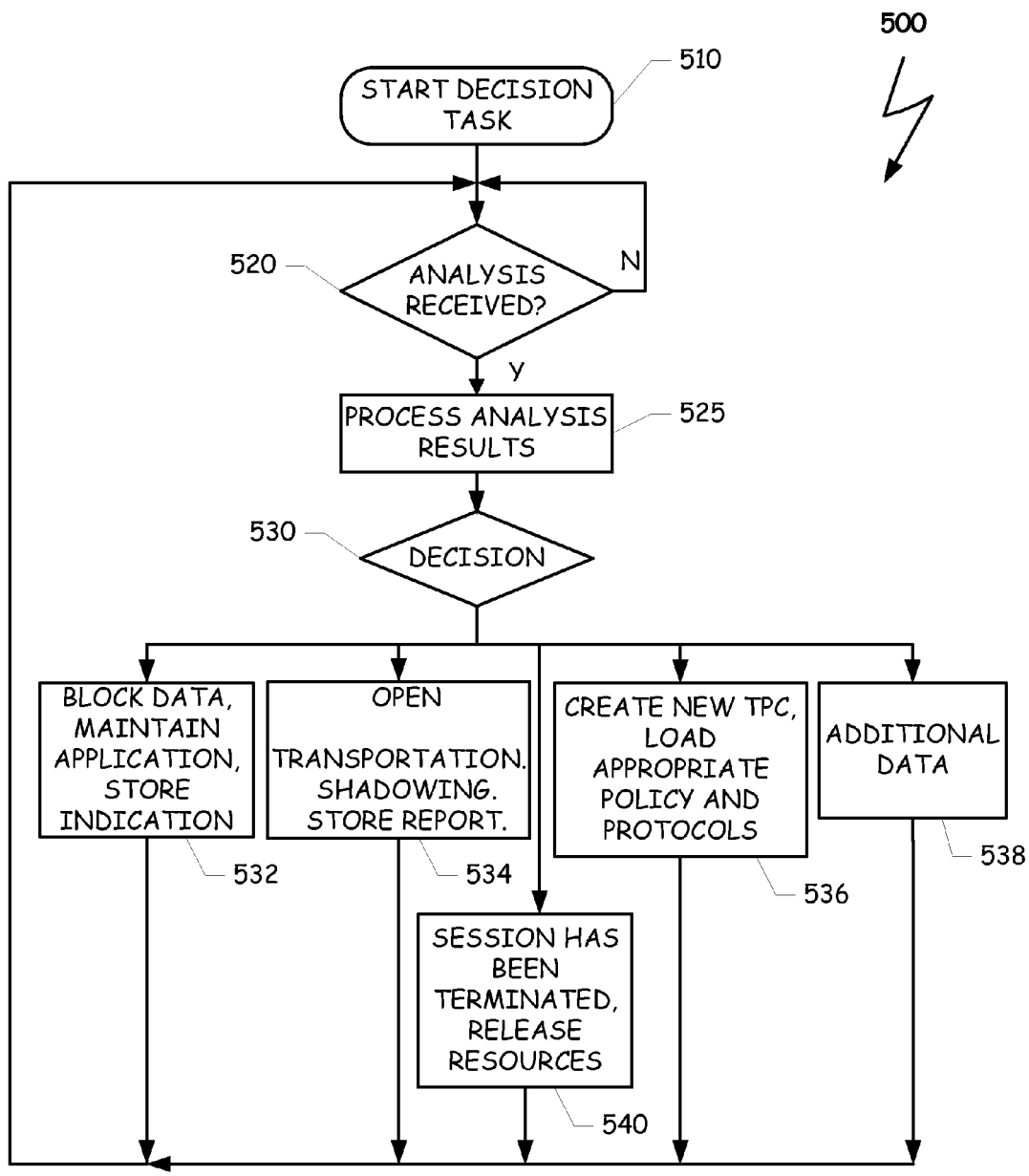
FIG. 5 illustrates a flowchart with relevant steps of an exemplary method for determining how to proceed with a session of data transportation.

FIG. 5 illustrates a flowchart with the relevant steps of an exemplary method 500. Method 500 may be used by the MDM 320 (FIG. 3) for determining how to proceed with a session of data transportation that is currently transferred via the security agent 230 (FIG. 2). Method 500 may be initiated 510 when the client computer 110*a-c* (FIG. 1) is turned on and may run as long as the computer 110*a-c* is operating. Upon initializing, the MDM 320 (FIG. 3) may wait for receiving an analysis report from one of the analyzers 356 that are currently active 520. The report may be stored and a pointer may be added to the connection table. An analysis may include information on the data communication layer that is processed by the TPC 350, to which the analyzer 356 belongs. For example, if the TPC that sent the report processes the layer of the communication port, then the report may include information on the port type, the type of the external device that is connected to the port, etc. If the level that is processed by the TPC is the device level, then the information may be on the type of application that is used. For example, if the device is a PDA, then the reports may indicate that the current application is a "synchronization application", etc.

At step 525 the MDM 320 may retrieve the reports that are associated with a session. Retrieving the reports may be done by using the pointers that are stored in the connection table. The reports may be initiated by one or more TPCs that are associated with the session, which is currently under the decision process. The reports may deliver information, such as but not limited to, information on the communication port, the device, the application that is used and the type of data that is transferred. Based on the reports, the indication of the current environment and the relevant security policy, the MDM 320 may reach a decision 530 regarding how to proceed with the connection.

An exemplary security agent 230 may reach five types of decisions. The decisions may include: (a) blocking the data transportation 532; (2) enabling the data transportation 534;

(3) creating an additional TPC 536; (4) waiting for an additional data portion 538, or (5) ending the communication session 540.

An example of a session that may be blocked by the security agent in step 532 may be a communication session in which the report from the TPC 350, which analyzes the port level, indicates that the communication port is USB and the device is WiFi dongle, and the report from the TPC, which analyzes the device level, indicates that the application is an Email application. Another example of a session that may be blocked at step 532 by the security agent 230 is a communication session in which the report from the TPC 350, which analyzes the port level, indicates that the communication port is SCSI and the device is removable disc driver; the report from the TPC, which analyzes the device level, indicates that the application is "Write to Disc".

Upon receiving a decision to block the data transfer of the current session, an instruction is sent to OC 316 instructing it to maintain the connection without transferring the information. For example, OC 316 may send an indication to the destination that the requested information is not found. In addition, information about the session may be stored in a report that may be sent to the security server 130. The information may be about the content, the time, the driver and the application that were used, the location, etc. The resources of the security agent 230 that have been allocated to this session may remain active in order to monitor other communication portions in the continuation of the session. For example, the application may be changed from copy information to synchronize a PDA. The new application (synchronization) may be allowed. Then the MDM 320 may return to step 520 and wait to the next analysis report.

An example of a session, which may be open (allowed) by the security agent 230 at step 534, may be a communication session in which the report from the TPC 350, which analyzes the port level, indicates that the communication port is USB and the device is a flash memory device, such as but not limited to DiskOnKey and the report from the TPC 350, which analyzes the device level, discloses identification parameters of the DiskOnKey. The session may be allowed if a DiskOnKey with the same identification parameters is allowed by the appropriate security policy.

Upon receiving a decision to open the data transfer of the current session 534, an instruction is sent to OC 316 instructing it to retrieve the appropriate data portions from the appropriate location in the buffer and transfer them toward their destination. Information about the appropriate location in the buffer and the destination may be found in the connection table. In parallel to sending the data to its destination, a copy of the data may be stored for shadowing. The instruction for shadowing may be written in the policy that is used. Shadowing may be stored in a location in the disc that cannot be accessed by the user. Indication about this session may be stored in a report that may be sent to the security server 130. The resources of the security agent that have been allocated to this session may remain active in order to monitor changes in the session. Then the MDM 320 may return to step 520 and wait for the reception of the next analysis report.

An example of a decision for initiating an additional TPC 536 may be reached when a report from the TPC 350, which analyzes the port level, indicates that the communication port is a USB port and that the device is a Bluetooth dongle, for example. Then a decision may be determined to initiate an additional TPC for processing the Bluetooth section of the data communication. A security policy that matches the Bluetooth device with or without the current environment may be loaded into the MDM 320. The appropriate protocol may be loaded to the new parser 352 (FIG. 3) and re-assembler 354. Information about analyzing the Bluetooth information is loaded into the analyzer 356. The previous TPC (the port TPC), may be instructed to transfer the appropriate section of the data to the new TPC for additional processing. Then the MDM 320 may return to step 520 to wait for the reception of the next analysis report. In some cases, additional information is needed in order to reach a decision 538. When this occurs, the MDM 320 may return to step 520 and wait for an additional analysis report. For example, this may occur under the scenario in which the application is "Write" to a DiskOnKey and the security policy requires checking of "Water Marks" in the content of the file. In this scenario, the MDM 320 may wait until the entire content of the file has been analyzed. "Water Marks" are "undetectable" digital images with 8 bit gray scales. The watermark is capable of carrying such information as authentication or authorization codes, or even a legend essential for image interpretation. This capability is envisaged to find application in image tagging, copyright enforcement, counterfeit protection, and controlled access to image data.

If the report that is received from the TPC, which processes the port level information, indicates that the communication session has been terminated 540, then the MDM 320 may release the resources that have been associated with the session. The resources may include, but are not limited to, the buffers and the one or more TPCs that have been associated with the session, etc. Then the MDM 320 may return to step 520 and wait to the next analysis report from another data communication session.

In this application the words "unit" and "module" are used interchangeably. Anything designated as a unit or module may be a stand-alone unit or a specialized module. A unit or a module may be modular or have modular aspects allowing it to be easily removed and replaced with another similar unit or module. Each unit or module may be any one of, or any combination of, software, hardware, and/or firmware In the description and claims of the present application the word WiFi is used to represent all types of Wireless LANs and not only 802.11b networks (for example it represents among others 802.11g, 802.11a, 802.16 etc).

In the description and claims of the present application, the word computer or client computer represent any end device, which has computing power. It includes among others cellular phones, PDAs, and other types of end equipment with a CPU that controls its behavior and communication.

In the description and claims of the present application, each of the verbs, "comprise" "include" and "have", and conjugates thereof, are used to indicate that the object or objects of the verb are not necessarily a complete listing of members, components, elements, or parts of the subject or subjects of the verb.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

The invention claimed is:

1. A method for controlling the transfer of data between a computer and an external device connected to a port of the computer, the method comprising the steps of:
   a. receiving, by a module on the computer, a data portion of a file being communicated during a data communication session between the computer and a removable external device, said removable external device connected to a physical communication port of the computer;
   b. analyzing, by said module, the data portion according to a protocol associated with the physical communication port;
   c. determining, by the module, based at least in part on said data portion analysis, whether a decision on whether to allow the data communication session may be reached, wherein if no decision may be reached on whether to allow said data communication session, then storing the data portion in a buffer, wherein the buffer is associated with the data communication session and returning to step 'a' and waiting for a next data portion, and if said decision may be reached, then proceeding to step 'd';
   d. determining, by the module, based at least in part on said data portion analysis, whether to allow the data communication session, wherein if said data communication session is to be allowed, then transferring the data portion with data stored in the associated buffer, if any exist, toward or from the physical communication port, and if said data communication session is not to be allowed, then modifying data transportation related to said data communication session.

2. The method of claim 1, wherein the step of modifying the data transportation comprises blocking the transportation.

3. The method of claim 1, wherein the step of modifying the data transportation comprises modifying the type of the transportation.

4. The method of claim 1, wherein the step of modifying the data transportation comprises modifying a status of a requested file.

5. The method of claim 1, wherein the step of modifying the data transportation comprises correcting the data according to the communication protocol.

6. The method of claim 1, wherein the physical communication port is selected from a group consisting of SCSI bus, Serial, Parallel, FireWire, PCMCIA bus, cellular, fiber channel, Bluetooth, iSCSI, Infiniband, and Infrared.

7. The method of claim 1, wherein the physical communication port is a USB port.

8. The method of claim 1, wherein the physical communication port is wireless.

9. The method of claim 1, wherein the step of analyzing the data portion further comprising:
   (i) determining whether additional processing based on a higher level protocol is required, wherein if additional processing is not required, then continuing at step 'c', otherwise continuing at step (ii); and
   (ii) processing part of the data portion relevant to the higher level protocol according to the higher level protocol and returning to step (i).

10. The method of claim 9, wherein the step of analyzing the data portion comprises analyzing relevant to a higher level protocol that is associated with the external device.

11. The method of claim 10, wherein the data communication session is associated with an application selected from a group consisting of synchronization applications for PDA, Java applications for synchronization with cellular phone, backup storage applications, Bluetooth and WiFi protocols.

12. The method of claim 1, wherein the step of analyzing the data portion is performed in respect of the data stored in the associated buffer.

13. The method of claim 1, wherein the step of determining whether a decision on the data communication session may be reached is performed in respect of the data stored in the associated buffer.

14. The method of claim 1, wherein the step of determining whether to allow the data communication session is performed in respect of the data stored in the associated buffer.

15. The method of claim 1, wherein the step of receiving a data portion comprises receiving a data portion selected from a group consisting of packet and SCSI block.

16. The method of claim 1, wherein the step of receiving the data portion comprises obtaining the data portion by emulating a class driver.

17. The method of claim 1, wherein step of receiving the data portion comprises obtaining the data portion by emulating a filter module.

18. The method of claim 1, wherein the step of analyzing the data portion according to a protocol associated with the physical communication port further comprises:
   i. parsing the data portion;
   ii. reassembling the data; and
   iii. analyzing the reassembled data.

19. The method of claim 1, wherein the step of determining whether to allow the communication session comprises reviewing a security policy.

20. The method of claim 1, wherein the step of determining whether to allow the communication session comprises examining the working environment in which the computer is operating and allowing the communication only if said computer is operating in one or more of certain working environments.

21. A system for protecting the transfer of data between a computer coupled to a private network and an external device, the system comprising:
   a client agent installed on the computer, the client agent having an associated security policy;
   a security manager communicatively coupled to the private network and operable to associate said security policy with the client agent;
   wherein the client agent is operative to:
      obtain at least a portion of a data transfer between a removable storage device connected to the computer through a physical communication port of the computer;
      analyze said at least a portion of the data transfer according to a communication protocol associated with the physical communication port; and
      determine whether the data transfer is allowable based, at least in part, on the analysis of the at least a portion of the data transfer and the security policy, and, if not determining whether the data transfer is allowable, then store the at least portion of the data transfer in a buffer associated with the data transfer and wait for a subsequent data portion and, if determining the data transfer is allowable, then transferring the at least a portion of the data transfer with data stored in the associated buffer, if any exist, toward or from the physical communication port.

22. The system of claim 21, wherein the security manager is operable to verify that the security policy is correct.

23. The system of claim 21, wherein the security policy includes a plurality of rules that at least define limits on data transfers during a communication session.

24. The system of claim 21, wherein the security policy includes a plurality of rules related to at least a content of the data portion and a type of an operation that can be performed during the communication session.

25. The system of claim 21, wherein the security manager is operable to disable any communication with the computer unless the client agent associated with the computer is active.

26. The system of claim 21, wherein the physical communication port is selected from a group consisting of SCSI bus, Serial, Parallel, FireWire, PCMCIA bus, cellular, fiber channel, Bluetooth, iSCSI, Infiniband, and Infrared.

27. The system of claim 21, wherein the physical communication ports is a USB port.

28. The system of claim 21, wherein the physical communication port is wireless.

29. The system of claim 21, wherein the client agent is associated with the security policy by loading the security policy into the client agent.

30. The system of claim 21, wherein the security manager is operable to verify that the security policy loaded into the client agent has not been modified.

31. The system of claim 21, wherein the client agent is further operative to transmit a report to a security server, the report identifying events that occurred with the computer in view of the security policy.

32. The system of claim 21, wherein the client agent is operable to analyze the data based on a higher level protocol that is associated with the removable storage device, wherein the removable storage device is selected from a group consisting of flash memory, removable hard disk drive, floppy disk, writable CD ROM, a PDA, a cellular phone, a WiFi dongle and a Bluetooth dongle.

33. The system of claim 21, wherein the client agent is operable to analyze the data based on a higher level protocol that is associated with an application selected from a group consisting of synchronization applications for PDA, Java applications for synchronization with cellular phone, backup storage applications, Bluetooth and WiFi protocols.

34. A computer having installed thereon a module operative to:
obtain at least a portion of a data transfer between the computer and an external storage device, the external storage device connected to at least one physical communication port of the computer;
analyze said at least a portion of the data transfer according to a communication protocol associated with the at least one physical communication port; and
determine whether the data transfer is allowable based, at least in part, on the analysis of the at least a portion of the data transfer and a security policy, and, if not determining whether the data transfer is allowable, then store the at least portion of the data transfer in a buffer associated with the data transfer and wait for a subsequent data portion and, if determining the data transfer is allowable, then transferring the at least a portion of the data transfer with data stored in the associated buffer, if any exist, toward or from the physical communication port.

35. The method of claim 10, wherein the device is a device selected from a group of devices consisting of flash memory, removable hard disk drive, floppy disk, writable CD ROM, a PDA, a cellular phone, a WiFi dongle and a Bluetooth dongle.

36. The method of claim 1, wherein determining whether a decision on whether to allow the data communication session may be reached is based on at least two data portions wherein at least one of said two data portions is stored in said buffer.

37. The method of claim 1, wherein determining whether to allow the data communication session is based on at least two data portions wherein at least one of said two data portions is stored in said buffer.

* * * * *